Patented Dec. 17, 1946

2,412,651

UNITED STATES PATENT OFFICE 2,412,651

PROCESS OF SEPARATING 3-PICOLINE, 4-PICOLINE, AND 2,6-LUTIDINE

George Riethof, Mount Lebanon, Pa.

No Drawing. Application June 15, 1945, Serial No. 599,767

8 Claims. (Cl. 202—42)

This invention relates to a separation process; and more particularly it relates to the separation of 3-picoline, 4-picoline, and 2,6-lutidine from one another.

One of the principal sources of these three compounds, 3-picoline, 4-picoline, and 2,6-lutidine is the basic coal tar oils in which they commonly occur associated with one another. These basic coal tar oils may be practically fractionated to produce certain cuts composed predominately of a mixture of 3-picoline, 4-picoline and 2,6-lutidine. Hence, these materials are generally commercially obtained as a basic oil mixture boiling about 140–145° C. Since these compounds boil so closely together, it is not commercially feasible to fractionate such basic oil mixtures into their separate components.

In my co-pending application, Serial No. 535,397, filed May 12, 1944, now Patent 2,383,016, granted August 21, 1945, I have disclosed that such bases may be separated from each other and recovered by azeotropic distillation utilizing a maximum boiling azeotrope and the process is carried out by admixing a suitable quantity of phenol with the basic oils.

I have now discovered that aliphatic acids having 2 to 5 carbons in the molecule, e. g., acetic, butyric, propionic and isobutyric acids may be employed to recover such bases by a process of azeotropic distillation utilizing a maximum boiling point azeotrope. The use of such acids has certain advantages over phenol. For instance, in the case of phenol it is always necessary that the phenol be used in much larger amounts, e. g., 2½ times as much as the basic oils. With the aliphatic acids, however, the reverse is true and they are used in less amount than the basic oils. The azeotrope produced by the acids is of a different composition from that produced by the use of phenol, particularly having different boiling points, e. g., in the case of acetic and propionic acids, the azeotropic distillation is advantageously conducted at much lower boiling points than with phenol.

It is a principal object of this invention to provide a process for the separation of 3-picoline, 4-picoline and 2,6-lutidine from one another and from basic coal tar oils comprised predominately of these compounds.

It is a further object to provide a process for resolving 3-picoline, 4-picoline and 2,6-lutidine containing oils into their separate components which can be easily operated with close control so as to yield commercially pure products.

It is a still further object to provide a new separation process which employs the use of maximum boiling azeotropic mixtures.

Additional objects and the entire applicability of the present process will become more apparent from the description of the invention given hereinafter.

The objects are accomplished according to the process of my invention by admixing the indicated basic oils with a suitable quantity of one of the aliphatic acids having 2 to 5 carbons in the molecule, and distilling from this mass the maximum boiling azeotropes of the basic components of the oil with the acid and separately collecting the various fractions.

The process of this invention is more fully illustrated in the following example, in which all parts are by weight unless otherwise specified:

*Example I*

A commercial mixture of 400 parts of a basic coal tar oil containing approximately 30% 2,6-lutidine, 35% 3-picoline and 35% 4-picoline is charged into the still pot of a rather high efficiency fractionating column. To this basic oil is added 210 parts of commercial glacial acetic acid, a ratio of acid to basic oil of about 1 to 2. The acid/basic oil mixture is then subjected to fractional distillation through the column. A forerun of approximately 53 cc. of the total mixture, mostly of acetic acid, is collected, after which the maximum boiling azeotropes of 2,6-lutidine, 3-picoline, and 4-picoline are collected in that order and at a temperature in the range of 148–155° C.

In order to obtain 3-picoline of high purity the middle or 3-picoline/acid azeotrope is again fractionated through a similar column and a middle fraction of 80% is collected. This middle fraction is then treated with an excess of sodium hydroxide solution and the 3-picoline is distilled off.

The 2,6-lutidine and the 4-picoline fractions are treated in a similar fashion in order to obtain the substantially pure compounds.

The temperature range given above may vary somewhat depending upon the barometric pressure. In the example, the pressure was approximately 750 millimeters.

*Example II*

In this example 320 parts of propionic acid and 400 parts commercial basic oils are employed, a ratio of acid to basic oil of about 3 to 4. The process is otherwise substantially as described in Example I, with the exception that a small forerun mostly of propionic acid is obtained, after which the maximum boiling azeotropes of 2,6-lutidine, 3-picoline, and 4-picoline are collected in that order and at a temperature in the range of 155–163° C.

The ratio of acid to basic oils, as illustrated in the above examples, may be varied from the examples, but there is always used a lesser amount of the acids by weight for each part by weight of basic oil employed. For efficient operation of the process, it has been found preferable to employ an amount of acid to form an azeotrope with all basic oil present.

The composition of the basic oil being treated may be varied. However, this process is principally applicable to those basic oils which are composed predominately of 3-picoline, 4-picoline and 2,6-lutidine. The ratio by weight of these latter materials may be varied relative to one another.

I claim:

1. The process of separating a mixture predominately containing at least two of the bases 3-picoline, 4-picoline, and 2,6-lutidine which comprises including in the mixture an aliphatic acid having 2 to 5 carbon atoms in the molecule, and fractionally distilling the mass.

2. The process of claim 1 wherein the distillates are acid maximum azeotropes of said bases.

3. The process of claim 1 wherein the mass distilled comprises a lesser amount of acid by weight than the weight of the basic oils.

4. The process of claim 1 wherein the distillate fractions are separately collected and redistilled and wherein the redistilled fractions are treated to recover the substantially pure base contained therein.

5. The process of separating a mixture containing at least two of the bases 3-picoline, 4-picoline, and 2,6-lutidine which comprises including in the mixture an aliphatic acid having 2 to 5 carbon atoms in the molecule fractionally distilling the mass, and thereafter recovering from the fractions the substantially pure base contained therein.

6. The process of claim 1 wherein the acid is acetic acid.

7. The process of claim 1 wherein the acid is propionic acid.

8. The process of claim 1 wherein the acid is isobutyric acid.

GEORGE RIETHOF.